No. 846,157. PATENTED MAR. 5, 1907.
L. STEPHENS.
ROPE GRAB FOR OIL OR OTHER DRILLED WELLS.
APPLICATION FILED DEC. 12, 1906.
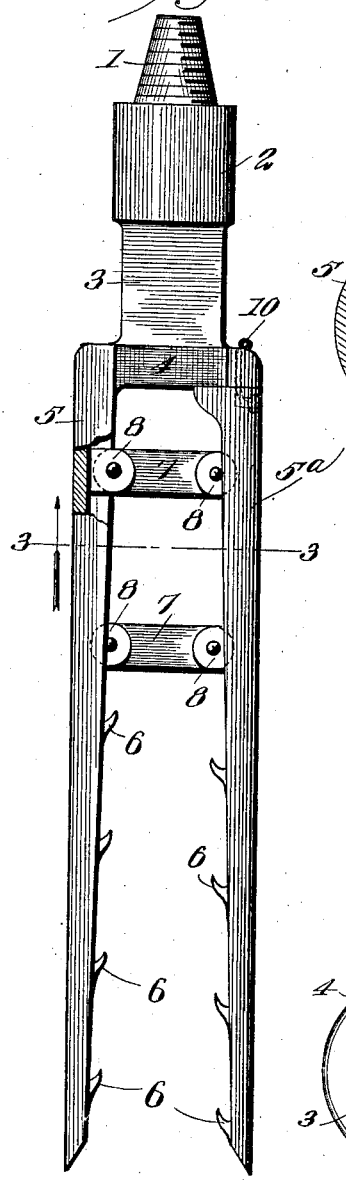
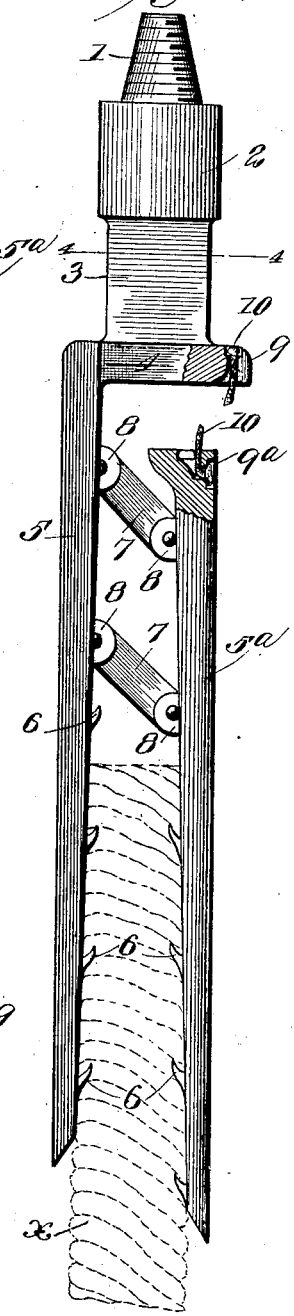
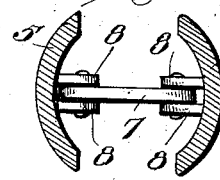
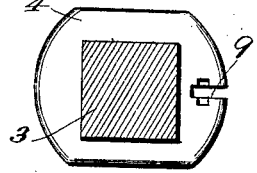
WITNESSES
INVENTOR
LAWRENCE STEPHENS
BY
ATTORNEYS

UNITED STATES PATENT OFFICE.

LAWRENCE STEPHENS, OF MACKSBURG, OHIO.

ROPE-GRAB FOR OIL OR OTHER DRILLED WELLS.

No. 846,157.  Specification of Letters Patent.  Patented March 5, 1907.

Application filed December 12, 1906. Serial No. 347,422.

*To all whom it may concern:*

Be it known that I, LAWRENCE STEPHENS, a citizen of the United States, and a resident of Macksburg, in the county of Washington, and State of Ohio, have invented an Improved Rope-Grab for Oil or other Drilled Wells, of which the following is a specification.

My invention is an improvement in devices employed for fishing out or recovering ropes lost in oil-wells.

The invention is more particularly an improvement in that class of rope-grabs consisting of opposing jaws, which are provided interiorly with teeth and movably connected in such manner that they will close upon a rope and hold it firmly gripped so that it may be drawn out of a well.

The details of construction, arrangement, and combination of parts are as hereinafter described, and illustrated in accompanying drawing, in which—

Figure 1 is a side view of my improved grab with the movable jaw secured in the position required for engaging a rope, a portion being broken out to show interior construction. Fig. 2 is also a side view of the grab, showing the movable jaw released and engaged with a rope, portions being broken away as before to show interior construction. Fig. 3 is a transverse section on the line 3 3 of Fig. 1. Fig. 4 is a cross-section on line 4 4 of Fig. 2.

1 indicates a head having a tapered screw-threaded end 2, whereby it is secured to a stem when in use, and 3 a rectangular portion or shank which is adapted for application of a wrench for screwing the grab to a stem. With the head 4, forming the base of part 3, is constructed integrally a jaw 5, which constitutes one of the parts of the grab proper. This jaw 5 is pendent from one side of the head and is preferably curved exteriorly and also interiorly in cross-section. The lower half of the jaw is provided interiorly with teeth 6, projecting upward at a considerable angle. The opposing but movable jaw $5^a$ is constructed substantially like the fixed jaw 5, it being curved in cross-section and similarly provided with teeth 6. It is connected with the fixed jaw by means of two parallel links 7, which are spaced apart but arranged above the middle of the length of the jaws. Each link 7 is formed of a flat elongated plate or bar, and the same is pivoted to each of the jaws, its ends being arranged between parallel lugs 8, which are formed integrally with the jaws. (See especially Fig. 3.)

It is apparent that the jaw $5^a$ is adapted to swing or move in a vertical plane relative to the fixed jaw 5, but is always held in a position parallel to the latter. When the grab is to be used, the movable jaw $5^a$ is raised and connected detachably with the head 4, as indicated in Fig. 1. To form such attachment, I provide the lateral projection of the head with a vertical bore or slot 9 and the enlarged top or head of the jaw $5^a$ with a bore $9^a$, which opens laterally and is enlarged at the top.

For detachable connection of the movable jaw with the head a small easily-breakable cord 10 is passed through the bores 9 $9^a$, which obviously coincide when the movable jaw is raised, as shown in Fig. 1. The upper end of the cord may be secured by a knot or wedge or any convenient fastening in the slot 9 of the head 4, and the other end may be similarly secured in the bore $9^a$.

In using the grab when a rope has been lost in a well the grab is attached to the stem and lowered into the well, the jaws being held in the position indicated in Fig. 1. The jaws taper or are inclined on their inner sides, and the lower ends are beveled interiorly, so that they are adapted to easily slide upon a rope $x$, whereupon the teeth 6 of the jaws take into the rope, so that when the grab is pulled upward the traction on the movable jaw $5^a$ will easily break the cord 10, and the said jaw assumes the position indicated in Fig. 2—that is to say, it drops downward and swings toward the fixed jaw 5. It is obvious that the greater the traction or pull on the grab the more firmly will the jaws clamp the rope $x$, and thus maintain their engagement therewith.

The links 7 will be made of different lengths in order to accommodate the grab to drilled holes of different sizes or diameters.

What I claim is—

1. The improved rope-grab comprising a head portion adapted for attachment to a stem, a pendent toothed jaw formed integrally with the head portion, a movable toothed jaw which is detachable from the head, means for connecting the two jaws, which consist of parallel links pivoted to each of the jaws, and a means for connecting the movable jaw with the head, detachably, the same consisting of an easily-breakable member, the engaging parts being provided with bores to receive the said member, substantially as described.

2. The improved rope-grab comprising a head portion having a pendent toothed jaw which is formed integrally with the head, a movable toothed jaw which is detachable from the head, parallel links connecting the two jaws so that the movable one maintains the same position relative to the other when the grab is in use, and breakable means for connecting the movable jaw with the head, as shown and described.

LAWRENCE STEPHENS.

Witnesses:
G. W. ARCHER,
C. E. AYERS.